United States Patent

Gerogiokas

(10) Patent No.: US 6,795,716 B2
(45) Date of Patent: Sep. 21, 2004

(54) SYSTEM AND METHOD OF OPERATING A WIRELESS BASE STATION WITH QUANTIZED USE OF TRANSMITTER POWER

(75) Inventor: Marios Gerogiokas, Sparta, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 655 days.

(21) Appl. No.: 09/854,850

(22) Filed: May 14, 2001

(65) Prior Publication Data

US 2002/0187811 A1 Dec. 12, 2002

(51) Int. Cl.$^7$ .............................. H04Q 7/20; H04B 1/38
(52) U.S. Cl. .................... 455/562.1; 455/448; 455/449; 455/447
(58) Field of Search ................................ 455/446, 447, 455/562.1, 448, 449, 522, 69

(56) References Cited

U.S. PATENT DOCUMENTS

| | | | |
|---|---|---|---|
| 4,926,134 A | 5/1990 | Olver .............................. 330/2 |
| 5,594,385 A | 1/1997 | Anvari ........................ 330/149 |
| 6,070,070 A | 5/2000 | Ladue .......................... 455/419 |
| 6,081,156 A | 6/2000 | Choi et al. ..................... 330/52 |
| 6,104,930 A | * 8/2000 | Ward et al. .................. 455/450 |
| 6,107,885 A | 8/2000 | Miguelez et al. ............ 330/276 |
| 6,151,512 A | 11/2000 | Chheda et al. ............... 455/562 |
| 6,178,328 B1 | 1/2001 | Tang et al. .................... 455/447 |
| 6,226,525 B1 | 5/2001 | Boch et al. .................. 455/522 |
| 6,415,162 B1 | * 7/2002 | Dent ......................... 455/562.1 |
| 6,483,817 B1 | * 11/2002 | Antonio et al. ............. 370/328 |
| 2002/0008577 A1 | * 1/2002 | Cova et al. .................... 330/52 |

* cited by examiner

*Primary Examiner*—Nay Maung
*Assistant Examiner*—Alan T. Gantt

(57) ABSTRACT

A wireless communications system and method is disclosed. A cell has a plurality of allocated sectors and a base station that communicates with mobile units contained within the cell. The base station has a transmitter that transmits communication signals along at least two carriers per sector within a cell. Each carrier within a sector is assigned a zone spaced from the base station, such as from an inner zone to an outer zone. The power per carrier is reduced successively from the outer to the inner zone.

24 Claims, 4 Drawing Sheets

ARCHITECTURE

SYSTEM AND METHOD OF OPERATING A WIRELESS BASE STATION WITH QUANTIZED USE OF TRANSMITTER POWER

FIELD OF THE INVENTION

This invention relates to wireless communications systems, and more particularly, this invention relates to wireless communications systems having multi-sectored cells with multi-carrier base stations.

BACKGROUND OF THE INVENTION

Cellular systems are in widespread use throughout the world and provide telecommunications to many different mobile users. Some of the cellular systems use different cells with alternate frequency bands and different carrier frequencies. A geographic area is covered with a plurality of these cells, and each includes a base station that communicates with a plurality of mobile stations. A mobile switch controller usually connects to the public switched telephone network or other communications network. Because of the increasing use of cellular telephones, it is necessary to have the base station accommodate as many different mobile units as possible. This can be accomplished by having powerful base stations, increasing the capacity to service a large number of mobile units.

Recently, it has become advantageous to divide one cell into a plurality of sectors. For example, in one common system architecture, a base station antenna has a 120° beam width corresponding to a cell that is divided into three sectors. While a three sector division is more common, it is also possible to divide a cell into six sectors, using an antenna having a 60° beam width, corresponding to a hex-sectored configuration.

Usually, in the preferred code division multiple access (CDMA) technology, the same frequency is used in all cells within the system architecture. When a mobile unit moves from one cell to another cell, a "soft" handoff occurs, where there is no switching in frequency, as compared to a "hard" handoff where a frequency change occurs. A "softer" or more soft handoff occurs when a mobile unit moves from one sector to a second sector within the same cell. In this type of handoff, a mobile unit can be communicating with two or more sectors in the same cell, as compared to a "soft" handoff where the mobile unit communicates with two sectors in different cells. Usually, in a "soft" handoff, two different channel elements are allocated from two different base stations by techniques known to those skilled in the art. In a "softer" handoff, different channel elements are not required and the same channel element could be used for both sectors in the same cell.

As noted before, in one well known CDMA distributed base station for cellular networks, three sectors are formed in each cell, such as in Flexent™, a CDMA distributed base station system manufactured and sold by Lucent Technologies Inc. This is a compact, low-cost base station. In one aspect of the Flexent™ system, it operates in the 850 MHz system with the 900, 1800, dual mode 900/1800 and 1900 GSM/PCS standards. In one type of system, it can support up to 12 transceivers and works with both outdoor cellular systems, and in other types of systems, as an indoor base station. The Flexent™ system, and other similar wireless systems, include a transmit (TX) radio frequency (RF) power section, as known to those skilled in the art. For example, in one type of architecture shown in FIGS. 2 and 3, a base station uses a three-sector, three-carrier system having nine ultralinear amplifier modules (ULAM), each having an associated hardware and a fixed cost. These amplifiers also consume DC electrical power and generate heat that must be dissipated. They also occupy cabinet space that could otherwise be used for additional features, and require installation and provisioning time. Thus, each ultralinear amplifier module contributes to the overall cost of the entire cellular system.

SUMMARY OF THE INVENTION

It is therefore an object of the present invention to provide a wireless communication system having a multi-carrier, multi-sector system that overcomes the disadvantages as noted above.

In accordance with the present invention, a wireless communication system has at least one cell with a plurality of sectors. A base station communicates with the mobile units contained within the cell and has a transmitter for transmitting communication signals along at least two carriers per sector within a cell. Each carrier within a sector is assigned an exclusive zone spaced from the base station from an inner zone to an outer zone. The power per carrier is reduced successively from the outer zone to the inner zone.

The base station defines a coverage area within the cell of three sectors and three carriers per sector. Each of the three carriers per sector is assigned to a respective inner zone, an intermediate zone, and an outer zone. The inner zone has handling capacity priority over the outer zone, in one aspect of the invention. The carrier of the inner zone can be activated before the carrier of the outer zone. As in many systems, the transmitter transmits the carriers as code division multiple access (CDMA) communications signals. The outer zone has an overlap of predetermined percentage, such as 15% to enhance handoff.

In yet another aspect of the present invention, the base station communicates with mobile units contained within the cell. The base station includes a transmitter for transmitting communications signals along three carriers per sector. A pair of linear amplifier modules receive and amplify the communication signals to be transmitted. Three carriers are within a sector and assigned respective inner, intermediate and outer zones spaced from the base station. The power per carrier is reduced successively from the outer to the inner zones. A three-way combiner receives each of the three carriers and a two-way divider splits the combined carriers into signals for receipt by the pair of amplifier modules.

A method of operating a base station within a cell of a wireless communication system is also set forth. Sectors are allocated within the cell. Wireless communication signals are transmitted from the base station along at least two carriers per sector. Each carrier is assigned to a different, exclusive zone spaced from the base station from an inner zone to an outer zone. The power is reduced a predetermined amount for each successive carrier from the outer to the inner zone.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous over a fixed range power deployment scheme for all sectors and uses a quantized system architecture to deliver the transmitter radio frequency power. Quantized power is delivered in multiple steps up to a total wattage, and reduces the number of ultralinear amplifier modules required per sector. This invention allows reduced costs for hardware and installation, reduced power consumption and improved performance. Heat dissipation requirements are also reduced.

In the present invention, the base station communicates with mobile units contained within the cell and various sectors, and has a transmitter for transmitting communication signals along at least two carriers per sector within a cell. Each carrier within a sector is assigned an exclusive zone, such as a geographic zone that is spaced from the base station, from an inner zone to an outer zone. The power per carrier is reduced successively from the outer to the inner zone.

Figure 1:
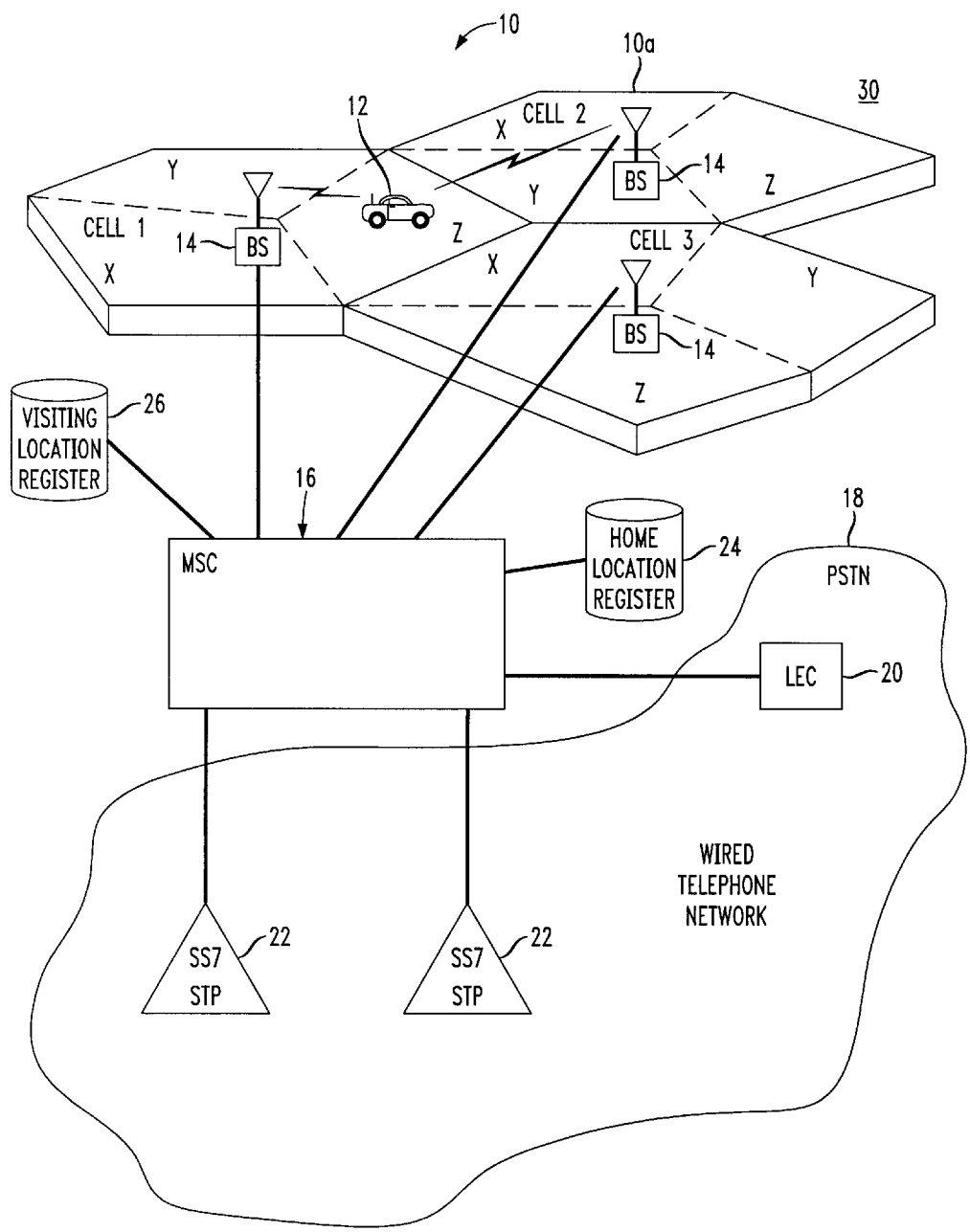
FIG. 1 is an overall view of the system architecture for a wireless communications system of the present invention.

For purposes of illustration, a code division multiple access (CDMA) wireless communications system is shown in FIG. 1 with three cells labeled cells 1–3. Each cell is split into three different sectors and, in one non-limiting example, has an antenna that forms a 120° beam width to correspond to a cell sectorized into the three illustrated sectors.

For purposes of illustration, the high level components of the system architecture, shown in FIG. 1, are described and followed by more detailed aspects of the present invention. It should be understood, however, that although a CDMA system architecture is described, the present invention is not relegated to the use of CDMA system architectures, but can also be used with other system architectures known to those skilled in the art, with different cellular and PCS service providers.

FIG. 1 illustrates a high level diagram of the system architecture for a cellular system 10 that is used in the present invention. The cellular system includes three basic parts, a radio interface, a network infrastructure, and an operation support system, which includes software and other system implementations. Three cells labeled cells 1–3 are illustrated, and each includes three different sectors, labeled x, y and z. Naturally, a different cell sectoring could be used in the present invention. Three carriers are provided for each sector, as a non-limiting example.

A mobile unit (MT) 12 is typically vehicle-mounted or a portable cellular phone, such as the small, portable phones carried by many users throughout the world. This mobile unit 12 stores the subscriber related information, including identity information, and interfaces with the base stations 14 through wireless communication channels, as known to those skilled in the art.

The base station includes appropriate transmit/receive circuits, and a beam forming, omnidirectional or other antenna system, as known to those skilled in the art. A mobile switching center 16 provides for switching, call processing and other subscriber related functions, and wirelessly connects through a base station 14 or a base station controller (not shown) to a mobile unit 12.

The mobile switching center 16 includes appropriate switching circuits and electronics as known to those skilled in the art. A base station controller could interconnect to a number of base stations 14 and provide multiplexing or other controlled cellular functions that are related to the network. The mobile switching center 16 is connected to the public switched telephone network (PSTN) 18 and/or Integrated Services Digital Network (ISDN) transport facilities (not shown), and can connect to local exchange carriers (LEC) 20 and the signaling system 7 network 22 having signal transfer points as STP devices, as part of the public switched telephone network 18.

Location register databases are provided and can include a home location register (HLR) 24 and a visiting location register (VLR) 26 that works in conjunction with the home location register 24. These registers 24, 26 assist in locating a subscriber and delivering a call to the mobile unit 12. Two other databases can be provided, including an authentication center (AC) and an equipment identity register (EIR) as explained below.

The home location register 24 is a database having data relating to the mobile unit 12 and facilitates mobility by keeping track of permanent and temporary data for the mobile unit. This data can include subscriber data including the mobile unit's access capabilities and service profile, and any basic or supplementary services. It could also provide information about roaming. Typically, a number of cells 10a are grouped together in a location area 30, and a location area identity is registered in the visiting location register 26, and stored in the home location register 24.

The visiting location register 26 could maintain information about the location and service for any mobile units entering a coverage area and works extensively as a dynamic database with extensive data exchange with the home location register 24. An authentication center could store the different authentication and encryption parameters to validate a subscriber and protect any mobile units and call processing through the interface. The equipment identity register could maintain records associated with the identity of any mobile units, including an international mobile equipment identity (IMEI).

Figure 2:
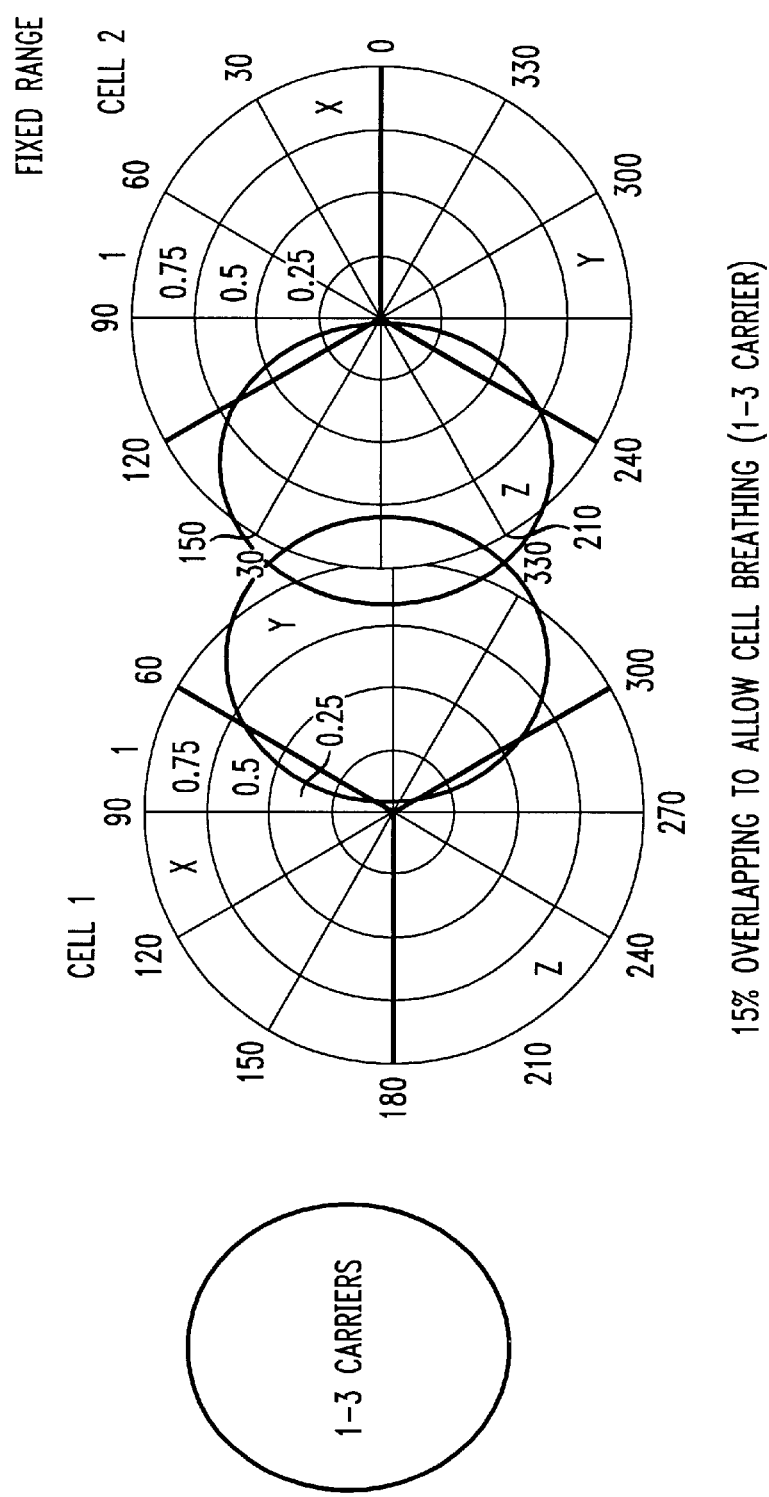
FIG. 2 is a prior art graph showing a present fixed range system with overlap.
Figure 3:
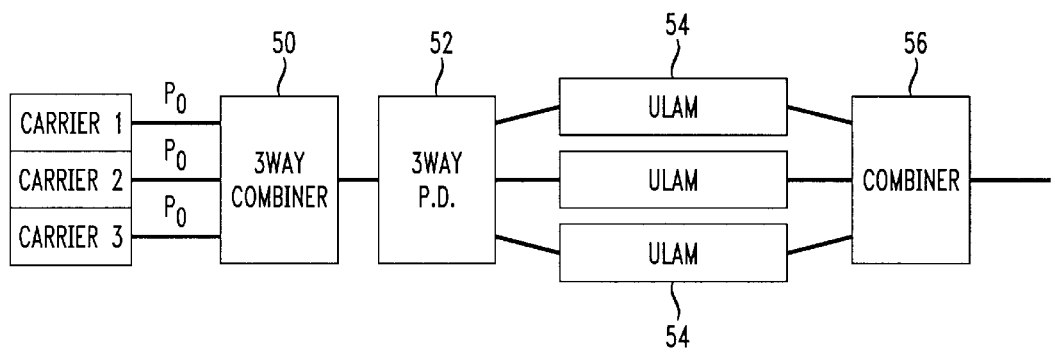
FIG. 3 is a block diagram illustrating a prior art architecture and showing three ultralinear amplifier modules for use with three carriers in a sector.

A prior art system architecture showing high level components and the type of fixed range power deployment architecture is shown in FIGS. 2 and 3. As shown in FIG. 3, three carriers, labeled carriers 1–3, have equal power represented as $P_0$, and enter a three-way combiner 50, and a three-way power divider 52 to be split as signals and passed into three respective ultralinear amplifier modules 54. The output from the amplifier modules 54 is forwarded to a three-way combiner 56. Thus, in this prior art architecture, three carriers all are part of a fixed range zone, as shown in FIG. 2, with 15% overlapping to allow cell breathing, with 1–3 carriers activated at one time.

Figure 5:
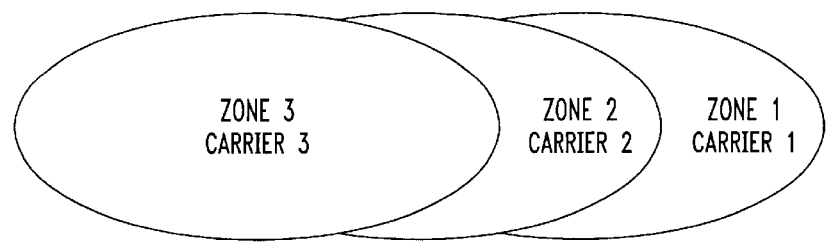
FIG. 5 illustrates a three carrier, three zone sector of the present invention.

The present invention is advantageous and provides for each carrier within a sector being assigned an exclusive zone spaced from the base station, in one non-limiting example, from an inner zone to an outer zone. This example is shown in FIG. 5, indicating three zones labeled zone 3, zone 2 and zone 1. Each zone becomes the exclusive domain of a specified carrier, with zone 3 corresponding to carrier 3, zone 2 corresponding to carrier 2, and zone 1 corresponding to carrier 1. This architecture is used with a standard three-sectored cell, each sector having three carriers, as known to those skilled in the art. Although the present description will proceed with reference to three carriers per sector, it should be understood that other architectures and modifications are possible, depending on the carrier and sector architecture chosen by those skilled in the art.

For example, in the prior art architecture shown in FIGS. 2 and 3, three carriers operate at full transmitter power at 3×40 watts, for a total of 120 watts. This can provide sufficient power to satisfy a 15% overlapping between sectors for handoffs and "breathing."

Figure 4:
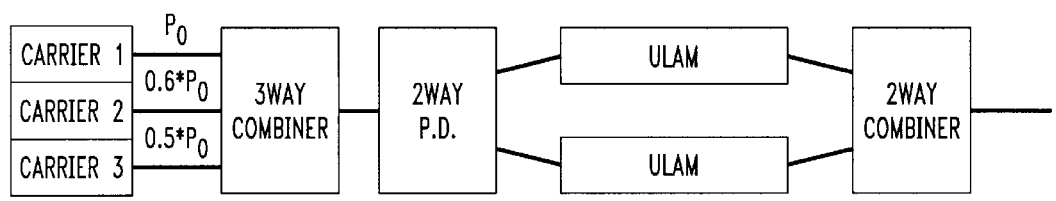
FIG. 4 is a block diagram of the system architecture of the present invention and showing the use of two ultralinear amplifier modules for use with three carriers in a sector.

In the present invention, reduced hardware and power is accomplished, where the quantized system is implemented to deliver the transmitter radio frequency power. As shown in FIG. 4, only two ultralinear amplifier modules 60 are provided per sector instead of three as in the prior art, reducing costs for hardware and installation, reducing power consumption, improving performance, and reducing the requirements for heat dissipation. A two-way power divider 62 and two-way combiner 64 are substituted for the three-way power divider 52 and three-way combiner 56. For example, quantized power can be delivered in three steps of 40 watts, 20 watts and 10 watts.

Figure 6:
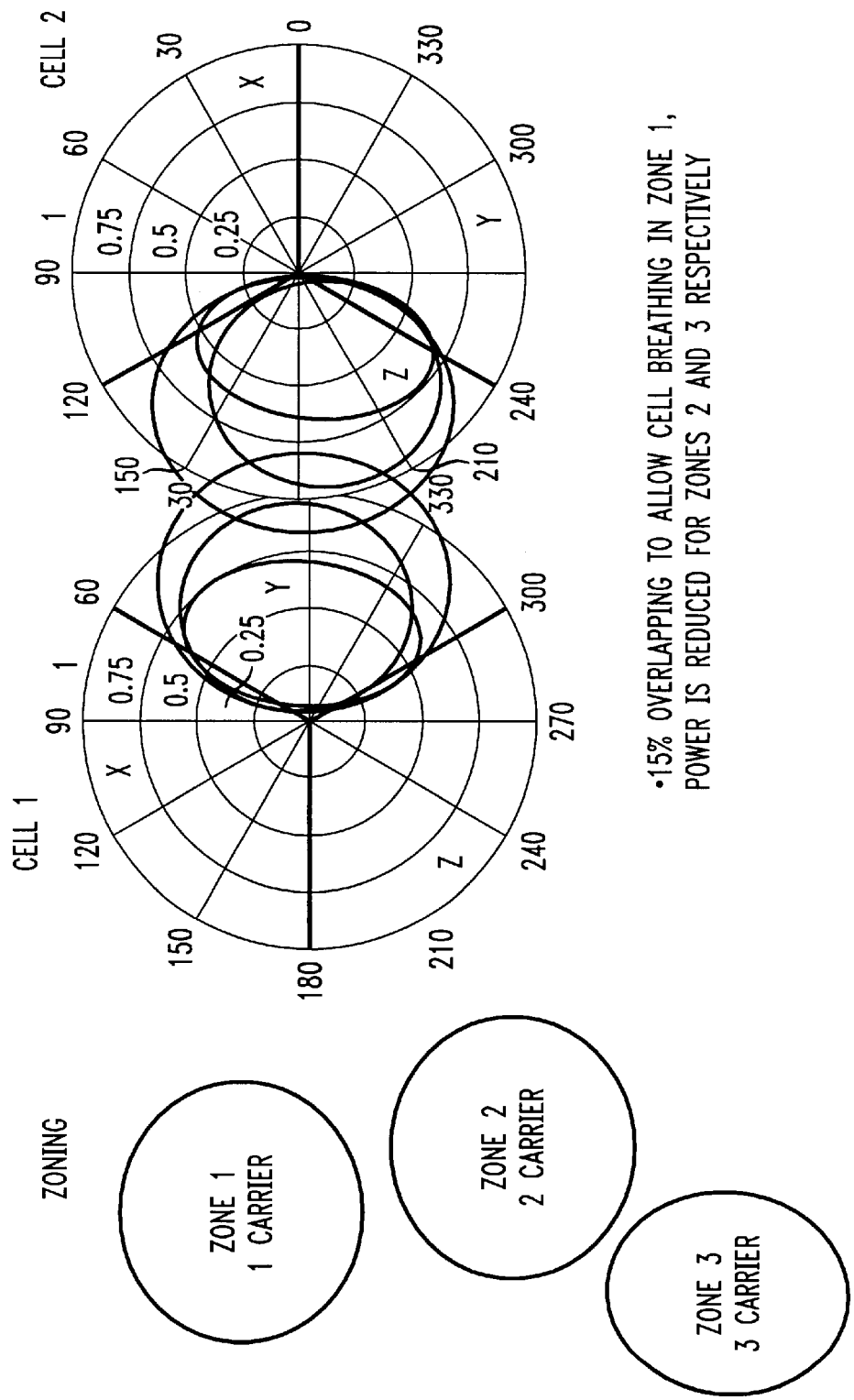
FIG. 6 shows three different zones for three different carriers and the respective geographical spacing and overlap of the inner, intermediate and outer zones, as in the present invention.

In the present invention, power is a tradeoff with coverage. There is always a statistical distribution of mobile units in a given sector in a cell's coverage area at any one time. Because of their location in the cell, not all mobile units require full power from the base station at any one time. Thus, each carrier is assigned an independent zone as shown in FIGS. 5 and 6. Each zone becomes the exclusive domain of a specified carrier. For example, as shown in FIG. 5, an inner zone, intermediate zone and outer zone, corresponding to zones 3, 2 and 1, are illustrated and correspond to carriers 3, 2 and 1. Zone 3 is the inner zone with the shortest range coverage, zone 2 is the intermediate range, and zone 1 is the outer zone with the longest range and includes a 15% requirement for overlapping and breathing as shown in FIG. 6 for handoff and other requirements as known to those skilled in the art.

In the present invention, the inner zone has priority over the intermediate zone in handling capacity. When the capacity in the inner zone is filled, the intermediate zone is activated. When the capacity in the intermediate zone is filled, the outer zone is activated. For example, for the mobile units that are outside the outer zone, traffic is handled by the intermediate zone. For those mobile units 12 that are outside the outer and intermediate zones, traffic is handled by the inner zone. This can be described as a "capacity spill over" system.

When a mobile unit moves away from the base station 14, the mobile unit 12 can be switched from the inner zone to the outer zone and generate semi-soft handoffs. The exit will always take place through the outer zone that complies with the 15% overlapping requirements. Thus, the system capacity would not be compromised even with semi-soft handoffs. For some special events and abnormal conditions that might create an uneven mobile unit distribution in the field, such as an excess MT concentration, the system could be handled differently and a cell extender could be used as a cost-effective solution. When a mobile unit is assigned a channel and moves toward the base station, from zone 1 to zone 2 to zone 3, no hand-offs are generated. The mobile unit will be carried from the outer zone to the inner most zone on the same carrier, such as carrier 1.

Different power levels could be achieved for respective zones depending on the cell location, e.g., urban or rural, and topography. For example, in one non-limiting example, the outer zone could be at full transmitter power, as compared to the intermediate zone, which could be at 0.3 transmitter power. The inner zone could be at 0.1 transmitter power. The coverage could be 11.5 miles when full transmitter power is used, as compared to 9.0 miles of coverage for the intermediate zone, i.e., at 0.3 transmitter power, and 7.0 miles of coverage for the inner zone at 0.1 transmitter power. This could be an example for a dense urban area where the propagation characteristics follow $1/D^5$ law and transmitted power reduction is about 54%. In this type of system, one ultralinear amplitude module reduction per sector could provide a 33% reduction in cost under some pricing and design schemes.

One example of truth table for mobile unit locations is illustrated below.

| Truth Table for Mobile Unit Location | | | |
|---|---|---|---|
| | Carrier 3 | Carrier 2 | Carrier 1 |
| Zone 1 | NOT | NOT | * |
| Zone 2 | NOT | * | * |
| Zone 3 | * | * | * |

* When a MT is detected in zone 1 only, carrier 1 handles traffic.
* When a MT is detected in zones 2 and 1, carrier 2 handles traffic.
* When a MT is detected in zones 1, 2 and 3, carrier 3 handles traffic.

To expedite capacity "spill over" priority in the present invention, the system does not designate operation to the strongest carrier since this carrier is always dedicated to the outer zone. Instead, in the carrier system with allocated channels 25, 50 and 75, for example, channels 25, 50 and 75 correspond to zones 3, 2 and 1, respectively. Zone 3 is the inner zone and the carrier has less power. When a MT requests a communication channel, the system will attempt to assign a channel with priority of 25, 50 and 75. The present invention can be applied to many different base stations with more than two carriers with no upper limit. It can be used with the Lucent Flexent™ system, a one-BTS system, a W-CDMA system as described, a GSM and TDMA wireless system, and thus, transparent to the different modulation types.

The present invention also provides a capacity increase by adding two more transmitters and receivers per sector without adding additional ultralinear amplifier modules (ULAM). As noted before, the prior art systems were limited to 3-sector, 3-carrier systems using nine ULAM's. With the present invention using quantized power, it is possible to have 3-sectors and five carriers with the nine ULAM's. In one sector, it was typical to have three carriers with the same power, 3×40, equaling 120 watts. With the power quantization of the present invention, it is possible to have a five carrier system having 40+30+25+15+10, as equaling 120 watts.

Many modifications and other embodiments of the invention will come to the mind of one skilled in the art having That which is claimed is:

1. A wireless communications system having at least one cell with a plurality of sectors and comprising:

a base station for communicating with mobile units contained within the cell, said base station having a transmitter for transmitting communication signals along three carriers (one, two and three) per sector within a cell, each carrier within a sector being assigned one zone spaced from the base station from an inner zone one an intermediate zone two and an outer zone three, wherein the power per carrier is reduced successively from the outer to the inner zone, such that when a mobile unit is detected in zone one only, carrier one handles traffic, when a mobile unit is detected in zones two and one, only carrier two handles traffic, and when a mobile unit is detected in zones one, two and three, carrier three handles traffic.

2. A wireless communications system according to claim 1, wherein said base station defines a coverage area within said cell of three sectors and three carriers per sector.

3. A wireless communications system according to claim 2, wherein each of the three carriers per sector is assigned to a respective inner zone, an intermediate zone and an outer zone.

4. A wireless communications system according to claim 1, wherein said inner zone has handling capacity priority over said outer zone.

5. A wireless communications system according to claim 1, wherein said carrier of said inner zone is activated before said carrier of said outer zone.

6. A wireless communications system according to claim 1, wherein said transmitter transmits said carriers as code division multiple access (CDMA) communication signals.

7. A wireless communications system according to claim 1, wherein at least one outer zone has an overlap of predetermined percentage for adjacent cell handoff.

8. A wireless communications system having at least one cell with a plurality of sectors and comprising:

a base station for communicating with mobile units contained within the cell, said base station further comprising
a transmitter for transmitting communication signals along three carriers per sector,
a pair of linear amplifier modules for receiving and amplifying communication signals to be transmitted, wherein said three carriers within a sector are assigned a respective inner, intermediate and outer zone spaced from the base station, and the power per carrier is reduced successively from the outer to the inner zone.

9. A wireless communications system according to claim 8, wherein said inner zone and intermediate zones have handling capacity priority over said outer zone such that inner and intermediate zones are activated before the outer zone.

10. A wireless communications system according to claim 8, wherein said carrier of said inner zone is activated before said carrier of said intermediate zone.

11. A wireless communications system according to claim 8, wherein said carrier of said intermediate zone is activated before said carrier in said outer zone.

12. A wireless communications system according to claim 8, wherein said transmitter transmits said carriers as code division multiple access (CDMA) communication signals.

13. A wireless communications system according to claim 8, wherein said outer zone has an overlap of predetermined percentage for adjacent cell handoff.

14. A wireless communications system according to claim 8, and further comprising a three-way combiner for receiving each of the three carriers, and a two-way divider for splitting the combined carriers into signals for receipt by said pair of amplifiers.

15. A method of operating a base station within a cell of a wireless communications system comprising:

allocating sectors within the cell;

transmitting wireless communications signals from the base station along three carriers (one, two and three) per sector;

assigning to each carrier a zone spaced from the base station from an inner zone three, an intermediate zone two, and an outer zone one; and reducing the power a predetermined amount for each successive carrier from the outer to the inner zone, such that when a mobile unit is detected in zone one only, carrier one handles traffic, when a mobile unit is detected in zones two and one, only carrier two handles traffic, and when a mobile unit is detected in zones one, two and three, carrier three handles traffic.

16. A method according to claim 15, and further comprising the steps of allocating three sectors per cell, with each sector having three carriers.

17. A method according to claim 16, and further comprising the step of assigning an inner zone to a first carrier, an intermediate zone to a second carrier and an outer zone to a third carrier.

18. A method according to claim 15, and further comprising the step of prioritizing the inner zone for handling capacity over the outer zone.

19. A method according to claim 15, and further comprising the step of overlapping the outer zone a predetermined percentage for adjacent cell handoff.

20. A method according to claim 15, and further comprising the step of transmitting the communications signals as code division multiple access (CDMA) communications signals.

21. A method of operating a base station within a cell of a wireless communications system comprising:

allocating three sectors within a cell;

transmitting wireless communications signals from the base station along three carriers per sector while amplifying the communications signals transmission within each sector with less than three linear amplifier modules per sector;

assigning to each of the three carriers a respective inner, intermediate and outer zone spaced from the base station; and reducing the power a predetermined amount for each successive carrier from the outer to the inner zone.

22. A method according to claim 20, and further comprising the step of prioritizing the inner zone for handling capacity over the outer zone.

23. A method according to claim 20, and further comprising the step of overlapping the outer zone a predetermined percentage for adjacent cell handoff.

24. A method according to claim 21, and further comprising the step of transmitting the communications signals as code division multiple access (CDMA) communications signals.

* * * * *